United States Patent [19]
Fink et al.

[11] Patent Number: 6,048,488
[45] Date of Patent: Apr. 11, 2000

[54] ONE-STEP RESIN TRANSFER MOLDING OF MULTIFUNCTIONAL COMPOSITES CONSISTING OF MULTIPLE RESINS

[75] Inventors: Bruce K. Fink, Havre de Grace, Md.; John Gillespie, Hockessin, Del.; Emanuele Gillio, Newark, Del.; Karl Bernetich, Wilmington, Del.

[73] Assignee: The United States of America as represented by the Secretary of the Army, Washington, D.C.

[21] Appl. No.: 08/956,595

[22] Filed: Oct. 23, 1997

Related U.S. Application Data

[60] Provisional application No. 60/043,051, Apr. 4, 1997.

[51] Int. Cl.[7] ..................................................... B32B 31/12
[52] U.S. Cl. ......................... 264/510; 264/102; 264/136; 264/137; 264/251; 264/255; 264/258; 442/260; 442/261; 442/399
[58] Field of Search .................................... 264/250, 251, 264/156, 136, 258, 137, 255, 510, 102; 442/260, 261, 399, 263

[56] References Cited

U.S. PATENT DOCUMENTS

| | | | |
|---|---|---|---|
| 1,923,275 | 8/1933 | Nollau | 442/263 |
| 2,599,359 | 6/1952 | Banks et al. | 442/263 |
| 2,805,181 | 9/1957 | Groff et al. | 442/399 |
| 4,350,732 | 9/1982 | Goodwin | 442/261 |
| 4,714,575 | 12/1987 | Preston | 264/257 |
| 4,758,395 | 7/1988 | Zion | 264/258 |
| 4,778,717 | 10/1988 | Fitchmun | 442/261 |
| 4,942,013 | 7/1990 | Palmer et al. | 264/511 |
| 5,023,041 | 6/1991 | Jones et al. | 264/258 |
| 5,500,164 | 3/1996 | Livesay et al. | 264/459 |
| 5,601,852 | 2/1997 | Seemann | 425/112 |
| 5,643,390 | 7/1997 | Don et al. | 156/307.1 |
| 5,705,446 | 1/1998 | Fujishiro et al. | 442/260 |

*Primary Examiner*—Jan H. Silbaugh
*Assistant Examiner*—Dae Young Lee
*Attorney, Agent, or Firm*—Paul S. Clohan; Mark D. Kelly

[57] ABSTRACT

Multiple resin transfer molding is the simultaneous injection of differing resins in fiber preforms with or without a separation layer. The flow of the resins is controlled by varying the permeabilities of the preforms and the separation layer. The method produces multifunctional hybrid composites made of multilayered preforms and multiple resins. A fundamental advantage of the invention is the simplification of the manufacturing process.

13 Claims, 1 Drawing Sheet

ONE-STEP RESIN TRANSFER MOLDING OF MULTIFUNCTIONAL COMPOSITES CONSISTING OF MULTIPLE RESINS

This application claims the benefit of U.S. Provisional Application No. 60/043,051, filed Apr. 4, 1997.

BACKGROUND OF THE INVENTION

The present invention relates to manufacturing techniques to produce multifunctional hybrid composites requiring multi-layered preforms and inserts and multiple resins through the thickness of the composite part.

Currently, multi-resin hybrid composite parts are produced through multiple process steps. Starting at the mold surface, each discrete resin/preform or prepreg combination is processed by hand lay-up, automated tow placement, Resin Transfer Molding (RTM), Vacuum Assisted Resin Transfer Molding (VARTM), Seemann Composites Resin Infusion Molding Process (SCRIMP), or other commonly used manufacturing processes. Layers are combined subsequently through co-cure or secondary bonding options.

Various composites manufacturing processes are used to impregnate fiber preforms with resin. Particularly, RTM and VARTM are used to manufacture composite parts. The processes involve the layup of dry reinforcing fibers in fabric, tape or bulk form as a preform in a closed mold environment, subsequently impregnating the preform with liquid resin using positive pressure, as in RTM, or negative pressure (i.e., vacuum) as in VARTM or SCRIMP or a combined form of both. The resin is cured and the part demolded. However, these processes have been limited to a single resin system.

Traditionally, multi-layered parts have been made using only plastics, using processing techniques such as injection molding, blow molding, and co-extrusion. However, these techniques have been limited to plastics without reinforcements.

The method of the present invention, Co-Injection Resin Transfer Molding (CIRTM), offers the potential to reduce cost and improve part performance and quality by using a single-step process while still offering the possibility of producing hybrid parts. The procedure can be applied to several existing manufacturing processes such as RTM, VARTM, or SCRIMP, which have been limited to single resin systems prior to this invention, as further discussed below.

A fundamental advantage of the invention is the ability to produce a multi-layer hybrid composite part in a single manufacturing step to improve performance, increase quality, and reduce costs. The CIRTM technique offers improved performance via co-cure of the materials, improving the toughness and strength of the interface and eliminating defects associated with secondary bonding. The CIRTM technique has several distinct advantages over the prior art:

It offers considerable cost savings by:

(1) reducing cycle times per part, allowing for higher volume production;

(2) reducing manpower costs and increasing quality through a reduction in opportunities for defects to be introduced during the manufacturing process;

(3) reducing the number of processing steps;

(4) reducing the energy needed to run the machinery;

(5) eliminating the need for adhesives and therefore eliminating the need for surface preparation to apply the adhesives and eliminating the set-up and tolerance problems and defects associated with secondary bonding.

Second, it offers considerable environmental advantages by:

(1) reducing emissions, due to the decreased number of steps;

(2) reducing waste in general and allowing for a more efficient use of material;

(3) completely eliminating the need for adhesives.

Third, it offers a considerable performance advantage by:

(1) reducing weight;

(2) improving bonding through co-cure and therefore improving mechanical properties;

(3) allowing for structural contribution from previously nonstructural layers.

SUMMARY OF THE INVENTION

It is an object of the present invention to provide a method of making a multiresin hybrid composite part which has fewer steps than prior methods.

It is another object of the invention to provide a method of making a multiresin hybrid composite part which, compared to the prior art, has cost savings, environmental advantages and performance advantages.

These and other objects of the invention are achieved by a method of making a composite part comprising providing first and second fiber preforms having first and second permeabilities; separating the first and second fiber preforms with a separation layer having a permeability lower than the fiber preform permeability; and simultaneously injecting a first resin in the first fiber preform and a second resin in the second fiber preform.

In one aspect of the invention, the method further comprises providing additional fiber preforms having the fiber preform permeability; separating the additional fiber preforms with additional separation layers having the separation layer permeability; and concurrently with the first recited injecting step, simultaneously injecting the additional fiber preforms with additional resins.

Another aspect of the invention is a method of making a composite part with a thin coating comprising providing a first fiber preform having a first thickness and permeability and a second fiber preform having a second thickness and permeability, the first thickness being less than the second thickness and the first permeability being greater than the second permeability; and injecting a first resin in the first fiber preform and a second resin in the second fiber preform.

In a preferred embodiment, the separation layer is a prepeg impregnated with a third resin which is compatible with the first and second resins.

In another embodiment, the separation layer is impermeable and compatible with the first and second resins.

In yet another embodiment, the separation layer includes three layers comprising a thin thermoplastic polymer film sandwiched between two layers of thermoset film adhesive, the thin thermoplastic polymer film being compatible with and diffusing into the thermoset film adhesive by the method of diffusion enhanced adhesion, the thermoset film adhesive being compatible with and bonding to the first and second resins.

These and other objects, features and advantages of the invention will become apparent from the following detailed description taken in conjunction with the accompanying drawings.

DETAILED DESCRIPTION OF THE PREFERRED EMBODIMENTS

Figure 1:
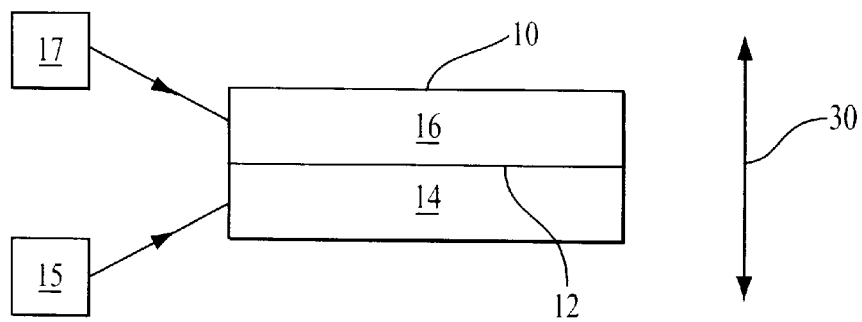
FIG. 1 schematically shows a co-injection apparatus.
Figure 2:
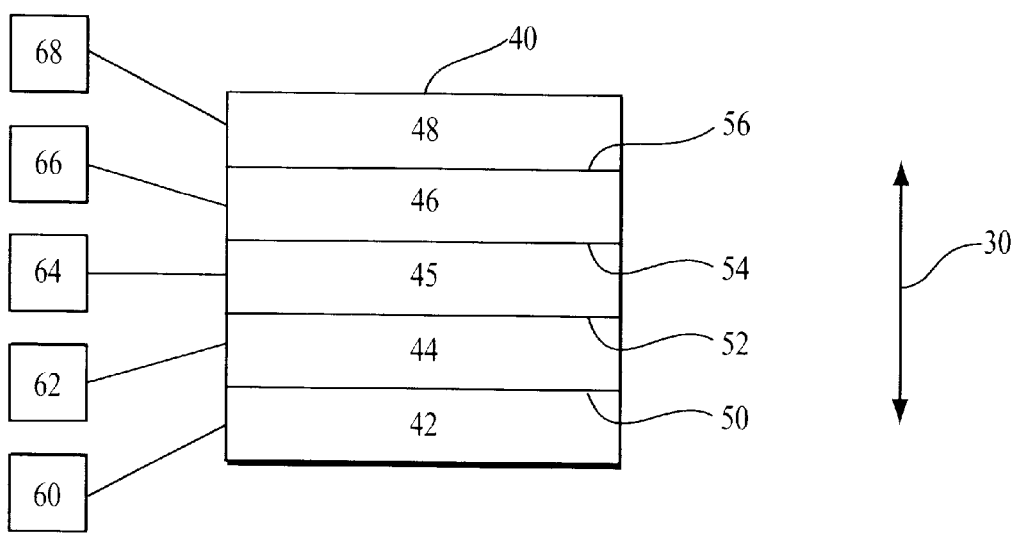
FIG. 2 schematically shows a mult-resin injection apparatus.

FIGS. 1 and 2 schematically show multiple resin injection apparatuses. The apparatus for performing CIRTM techniques is very similiar to that for other RTM, VARTM, or SCRIMP processes. For example, in the case of the VARTM, the apparatus used for CIRTM applied to the VARTM process includes vacuum pumps, resin flow tubing, and resin mixing containers and equipment. The difference in the apparatus is that there may be multiple resin mixing containers and resin traps with multiple resin tubes in accordance with the number of separate resins or fill planes being incorporated in the part. Similiarly, in some cases, identical equipment may be used and a secondary or tertiary, etc. resin may be placed into the first or second, etc. resin bucket if a series-type resin flow method is being used.

FIG. 1 shows the simplest case: two-resin injection. In FIG. 1, two different resins A, B are simultaneously injected by injectors 15, 17 into a mold 10 filled with fiber preforms 14, 16. A separation layer 12, which can be of various forms as discussed below, may or may not be present.

FIG. 2 shows the general multiresin apparatus. In FIG. 2, a plurality of different resins are simultaneously injected by injectors 60, 62, 64, 66 and 68 into a mold 40 filled with fiber preforms 42, 44, 45, 46 and 48. Separation layers 50, 52, 54 and 56, which can be of various forms as discussed below, may or may not be present. Fiber preforms 48 and 46 represent the nth and n-1 preforms, respectively. Separation layers 56 and 54 represent the nth and n-1 separation layers, respectively. Injectors 68 and 66 represent the nth and n-1 injectors, respectively.

The following techniques may be used to control the flow in the thickness direction (the direction indicated by the line 30 in FIGS. 1 and 2):

A. LESS PERMEABLE LAYER AS SEPARATOR: Different permeability preforms can be used to control the flow of the resins. This technique is based on the fact that resins will follow the path of least resistance, and resin will therefore flow through the high-permeability material before impregnating the low-permeability material. In this case, the two fiber preforms 14, 16 are made of higher permeability material than the separation layer 12. This will cause the resin to flow through the high-permeability material 14, 16 and not through the low-permeability separation layer 12.

B. HIGH PERMEABILITY LAYER ON SURFACE: Using the same method described in A. above, it is possible to manufacture a part with a thin coating. In this case, a thin preform layer 16 of high-permeability material is placed on a thicker preform layer 14 of low-permeability material, and no separation layer is used. Resin B will follow the path of least resistance and remain in the thin preform 16, while Resin A will fill the thicker preform 14. This allows for a thin coating to be placed on a structural component; however, the thin coating does have fiber reinforcement and contributes to the overall structural strength of the part.

C. IMPERMEABLE LAYER AS SEPARATOR: An impermeable layer, such as a thermoplastic film or a rubber layer, can be used as a separation layer 12. The layer 12 maintains the separation of the flow of the two resins. Additionally, the layer 12 which is compatible with Resins A and B should be chosen so that during the curing process the layer toughens the interface between the two resins.

D. LOW PERMEABLE LAYER AS SEPARATOR: A very low-permeability preform can be used to stop the flow in the thickness direction. Returning to FIG. 1, the separation layer 12 can be a prepreg impregnated with resin that is compatible with Resins A and B. The prepreg serves a dual purpose: it controls the flow in the thickness direction and, additionally, allows for improved bonding because the resin on the preimpregnated material is partially cured and will therefore cure with the resin once the mold is filled. The preimpregnated layer 12 can be of two kinds: a commercially available prepreg or simply a layer of fabric that is wet out manually as the preforms are laid up.

E. FILM ADHESIVE SEPARATION LAYER: A film adhesive can be used as a separation layer 12 to keep the resins separate. The specific kind of adhesive must be picked to be compatible with the resins being used in the process.

F. CATALYST-RICH SEPARATION LAYER: A catalyst-rich separation layer 12 can be used to accelerate the kinetic reaction of the resin. The resin flowing through the preform will slow down when it comes in contact with the catalyst and a chemical reaction causes the viscosity to increase, rapidly slowing down the flow.

G. SERIES FLOW METHOD: The techniques described above generally direct flow in the plane of the part, maintain separation of the resins through the thickness and allow for injection of the resins either simultaneously in a parallel flow fashion or one after the other in a series flow fashion. In another method, multiple resins can be injected in series without the use of a separation or any of the methods described above if flow can be generally achieved in the through-thickness direction. In this case, the first resin moves to the opposite surface of resin injection and the second resin follows behind the first filling in the next layer of the preform stack. Subsequent resins fill the next layers until the part is completely filled.

H. COMBINATIONS OF METHODS A–G: In many cases, combinations of the above methods provide the most effective separation and, additionally, provide the best strength and fatigue attributes. An example is the combination of methods C and E and taking advantage of diffusion enhanced adhesion to obtain optimal bondline quality. Diffusion enhanced adhesion is discussed in U.S. Pat. No. 5,643,390 issued to Don et al and hereby expressly incorporated by reference into the present specification.

All of the techniques explained above (A.–H.) were successfully reduced to practice between June 1996 and December 1996 at the University of Delaware's Center for Composite Materials (UD-CCM). Following are some examples of parts that were successfully manufactured using the various techniques.

Figure 3:
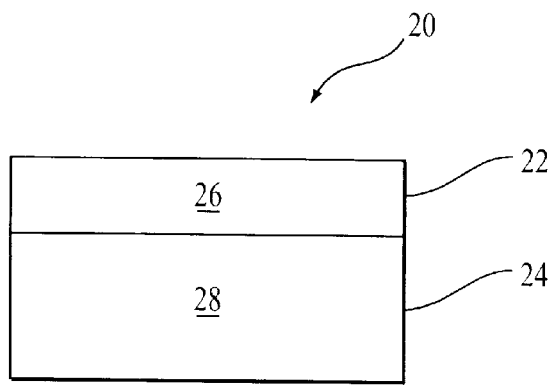
FIG. 3 shows a manufactured part with a thin coating.

Among the parts successfully manufactured was a two-layered structure 20 (see FIG. 3) comprised of a thin phenolic layer 22 and a thick SC-4 epoxy layer 24. The phenolic impregnated three layers 26 of E-glass random mat, while the epoxy impregnated 10 layers 28 of 24-oz. E-glass 4×5 weave. The part 20 was fabricated by exploiting the permeabilities of the preforms, as explained in part B. above. The epoxy served as structural support, being particularly suited to support loads. The phenolic layer 22 was used for its properties in protecting against fire, smoke, and toxicity. In this multi-layer, multi-resin structure, each resin served a specific purpose, while being integrated in a single structure. Additionally, no adhesives were necessary, and the whole part was fabricated in a single step and co-cured.

Parts were successfully manufactured using a thin thermoplastic film as a separation layer 12. The film chosen was polysulfone because of its good compatibility with epoxy resins. For example, a part was constructed using two preforms, each made up of 10 layers of E-glass, 24-oz., 4×5 weave and using polysulfone as a separation layer. The two resins used were SC-4 epoxy and Epon 826 epoxy, and the polysulfone successfully diffused in the resins. The same preforms were used to produce parts based on the method explained in part C. above. This was done successfully using a polyester prepreg as a separation layer 12. The two resins used were SC-4 epoxy and Derakane 411-350 vinyl ester resins.

A combination of the separation techniques described above was also reduced to practice. A dual layered structure containing a layer of phenolic resin and another layer of vinyl ester resin was manufactured. The phenolic resin used was British Petroleum's J2027 with Phencat 381 curing agent mixed 5% by weight, this phenolic has a low viscosity, approximately 350 centipoise at room temperature. The vinyl ester used was Dow Derakane 411-350 with Cobalt Naphthenate as an accelerator and an organic peroxide as the curing agent. This vinyl ester has a similar viscosity to the phenolic used and a room temperature cure. The separation layer used was a combination of methods C and E described above. A layer of thin polysulfone film, approximately 1/1000 inch thick, was sandwiched between two layers of an epoxy based film adhesive. The film adhesive used was 3M's AF-163-20ST. The adhesive was picked to have similar or compatible cure temperatures with the resins used and to be made with a resin which is compatible with both phenolic and vinyl ester. This adhesive is an amine cured epoxy which is compatible with both of the resins, has compatible cure cycles and additionally takes advantage of the Diffusion Enhanced Adhesion (See U.S. Pat. No. 5,643,390) of epoxy into polysulfone. This method offers a number of major advantages: toughened interphase, unlimited part size due to the presence of the polysufone film which acts as an impermeable barrier and a wide variety of layer thicknesses and resin viscosities.

Some of the advantages of the invention are:

Cost reduction and economic advantages:
  A. Reduced number of processing steps needed to manufacture a part.
  B. Reduced cycle times per part due to the reduction of processing steps.
  C. Reduced miscellaneous expenses due to fewer processing steps.
  D. Reduced manpower due to fewer lay-ups and fewer processing steps.
  E. Less manufacturing space required.
  F. Elimination of the need for adhesives.
  G. Elimination of the need for surface preparation for adhesives.
  H. Reduced energy consumption due to less manpower, fewer processing steps, and shorter cycle times.

Environmental advantages:
  A. Reduced emissions.
  B. Reduced waste through better use of material and resources and reduction in processing steps.
  C. Offers the potential to eliminate completely the use of adhesives.
Co-cure advantages:
  A. Improved interface toughness.
  B. No degradation of interface properties.
  C. Improved ballistic performance.
Performance advantages:
  A. Reduction in weight due to the elimination of adhesives.
  B. Improved mechanical properties as the result of the co-cure advantages.
  C. Possibility of getting structural contribution from previously nonstructural layers.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method of making a composite part comprising:
   providing first and second fiber preforms having first and second permeabilities in a mold;
   simultaneously injecting a first resin in the first fiber preform and a second resin in the second fiber preform in a vacuum assisted resin transfer molding process in the mold; and
   separating the first and second fiber preforms with a separation layer having a permeability lower than the fiber preform permeability, whereby the first and second resins will flow through the first and second preforms and not through the separation layer and whereby separation of the resins is maintained in the mold.

2. The method of claim 1 wherein the separation layer is impermeable and compatible with the first and second resins.

3. The method of claim 2 wherein the separation layer is one of a thermoplastic film and a rubber layer.

4. The method of claim 3 wherein the thermoplastic film is polysulfone, the first resin comprises SC-4 epoxy and the second resin comprises Epon 826 epoxy.

5. The method of claim 1 wherein the separation layer includes three layers comprising a thin thermoplastic polymer film sandwiched between two layers of thermoset film adhesive, the thin thermoplastic polymer film being compatible with and diffusing into the thermoset film adhesive by the method of diffusion enhanced adhesion, the thermoset film adhesive being compatible with and bonding to the first and second resins.

6. The method of claim 5 wherein the thin thermoplastic polymer film is polysulfone, the thermoset film adhesive is epoxy, and the first and second resins are phenolic and vinyl ester, respectively.

7. The method of claim 5 wherein the thin thermoplastic polymer film is polysulfone, the thermoset film adhesive is epoxy, and the first and second resins are phenolic and epoxy, respectively.

8. The method of claim 5 wherein the thin thermoplastic polymer film is polysulfone, the thermoset film adhesive is epoxy, and the first and second resins are phenolic and polyester, respectively.

9. The method of claim 1 wherein the separation layer is a prepeg impregnated with a third resin which is compatible with the first and second resins.

10. The method of claim 9 wherein the prepreg comprises polyester, the first resin comprises SC-4 epoxy and the second resin comprises Derakane 411-350 vinyl ester.

11. The method of claim 1 further comprising:
providing additional fiber preforms having the fiber preform permeability;
separating the additional fiber preforms with additional separation layers having the separation layer permeability; and
concurrently with the first recited injecting step, simultaneously injecting the additional fiber preforms with additional resins.

12. The method of claim 1 wherein the separation layer is a film adhesive which is compatible with the first and second resins.

13. The method of claim 1 wherein the separation layer comprises a catalyst which causes a viscosity of the resins to increase.

* * * * *